(12) United States Patent
Montagne

(10) Patent No.: US 7,708,431 B2
(45) Date of Patent: May 4, 2010

(54) LIGHTING DEVICE HAVING A CYLINDRICAL LENS

(75) Inventor: Louis Montagne, Cailloux sur Fontaines (FR)

(73) Assignee: Koninklijke Phillips Electronics N.V., Eindhoven (NL)

( * ) Notice: Subject to any disclaimer, the term of this patent is extended or adjusted under 35 U.S.C. 154(b) by 768 days.

(21) Appl. No.: 10/596,733

(22) PCT Filed: Dec. 29, 2004

(86) PCT No.: PCT/IB2004/004314

§ 371 (c)(1),
(2), (4) Date: Jun. 22, 2006

(87) PCT Pub. No.: WO2005/073619

PCT Pub. Date: Aug. 11, 2005

(65) Prior Publication Data

US 2009/0016070 A1    Jan. 15, 2009

(30) Foreign Application Priority Data

Jan. 5, 2004   (EP) .................................. 04300003

(51) Int. Cl.
F21V 5/04    (2006.01)

(52) U.S. Cl. .......................... 362/335; 362/26; 362/555
(58) Field of Classification Search ................. 362/335, 362/551, 555, 26, 27, 582, 333, 249
See application file for complete search history.

(56) References Cited

U.S. PATENT DOCUMENTS

| | | | | | |
|---|---|---|---|---|---|
| 2,478,891 | A | * | 8/1949 | Bernier | 352/62 |
| 3,654,451 | A | * | 4/1972 | Starr | 362/224 |
| 3,739,169 | A | * | 6/1973 | Weinreich | 362/542 |
| 5,463,280 | A | * | 10/1995 | Johnson | 315/187 |
| 6,227,679 | B1 | * | 5/2001 | Zhang et al. | 362/236 |
| 7,123,419 | B1 | * | 10/2006 | Simon | 359/641 |

\* cited by examiner

*Primary Examiner*—Gunyoung T Lee
(74) *Attorney, Agent, or Firm*—Thorne & Halajian, LLP

(57) ABSTRACT

A lighting device includes at least a light source for emitting light rays and a guide for guiding light rays on a projection plane. The guide is formed by a lens presenting a cylindrical portion extending along an axis perpendicular to the projection plane, and at least one convex shaped surface extending at an extremity of the cylindrical portion. The convex shaped surface is adapted to direct a portion of the light rays emitted from the light source towards the projection plane. This enables to project the light towards a projection plane quasi parallel to the beam direction without using any guides on the projection plane itself.

16 Claims, 11 Drawing Sheets

LIGHTING DEVICE HAVING A CYLINDRICAL LENS

FIELD OF THE INVENTION

The present invention relates to the field of lighting devices and their applications. More particularly the invention relates to a lighting device including at least a light source for emitting light rays and means for guiding the light rays on a projection plane.

BACKGROUND OF THE INVENTION

Such a lighting device is known from the document EP0242739. Means for guiding the light are constituted of strips and bars provided on the projection plane. Such a solution presents the drawback of being cumbersome because of the presence of a grid of strips and bars. The size of such a lighting device can not be reduced more than the desired size of the display. Applications for such a lighting device are consequently reduced to display applications mainly.

SUMMARY OF THE INVENTION

An advantage of one or more embodiments is thus to propose a compact solution for a lighting device as above presented adaptable to many applications.

To this end, the invention proposes that said guiding means are formed by a lens presenting a cylindrical portion extending along an axis perpendicular to said projection plane and at least a convex shaped surface extending at an extremity of said cylindrical portion and adapted to direct a portion of the light rays emitted from said light source towards said projection plane.

This solution enables to project the light towards a projection plane quasi parallel to the beam direction, i.e. the direction where the light distribution presents a maximum, without using any guiding means on the projection plane itself. This solution is consequently very compact as only the light source and the lens are needed. Said lens is very compact contrarily to the guiding means proposed in the document of the prior art. Said cylindrical portion enables to direct the light rays in a narrow strip in planes that are quasi parallel to the beam direction. Said convex surface enables to direct the light rays towards said projection plane.

According to an embodiment of the lens, said cylindrical portion has a circular base that is extended along an axis to form the cylindric portion. Said cylindrical portion may also have any shape base having the same optical effect (curved, meniscus, fresnel etc.). Such characteristics enable to direct the light rays in a first direction of the space quasi parallel to the beam direction.

Said lens may be shaped such as two convex surfaces are extending at both extremities of said cylindrical portion. Such convex surfaces enable to direct the light rays towards said projection plane. Said convex surface may be parabolic.

According to another embodiment of the invention, said convex surface may be an hemispherical surface symmetrical in rotation around said cylindrical portion axis.

According to an alternative of the invention, said lighting device further includes several light emitting diodes for a same lens. It enables to obtain multicolored beams.

According to an application of the invention, said projection plane be a sheet of transparent material dedicated to transmit the light by refraction, the light being visible in different direction by diffusion. According to a further application of the invention, such a transparent projection plane can be added parallely to another opaque projection plane.

According to another application of the invention, said lighting device further includes an optical element placed beyond the lens with respect to the light source. Said optical element presents features drawn line by line in order that said lighting device project a significant image on said projection plane. Such an optical element is often called a gobbo.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
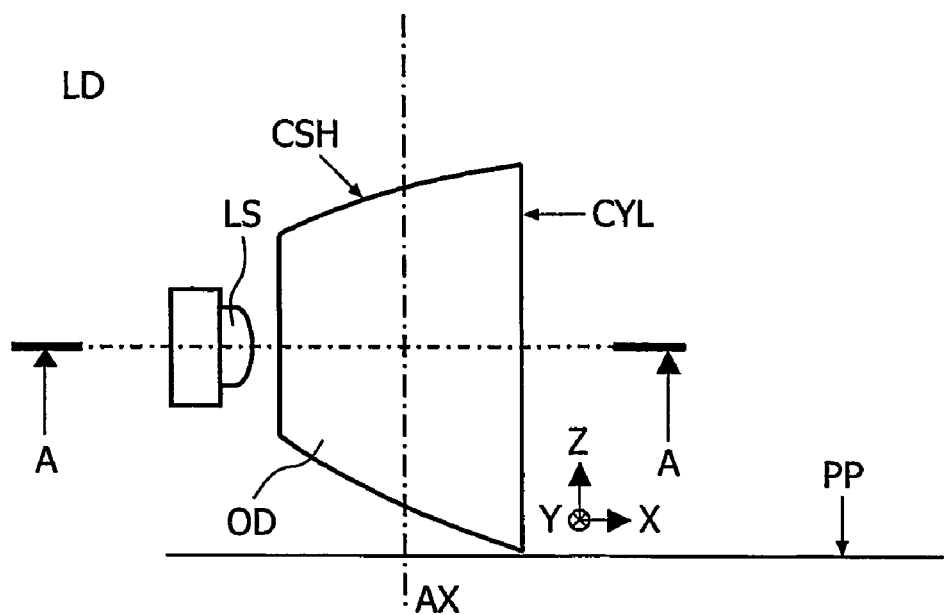
FIG. 1 schematically represents an exemplary embodiment for a lighting device of the invention.

FIG. 1 schematically represents a lighting device according to the invention. Said lighting device includes a light source LS and guiding means. For example, said light source is a light emitting diode. Such light source presents the advantage to be very compact and to enable to obtain a large diversity regarding the light colour and the light power. Said guiding means is constituted of a lens OD presenting a cylindrical portion CYL extending along a cylindrical portion axis AX perpendicular to a projection plane PP and at least a convex shaped surface CSH extending at an extremity of said cylindrical portion CYL and reflecting and refracting a part of light rays emitted from said light source LS towards said projection plane PP. Said lens is for example formed from glass or any other optical material. Said lens can be full or have a cavity filed with a liquid for example.

Figure 2:
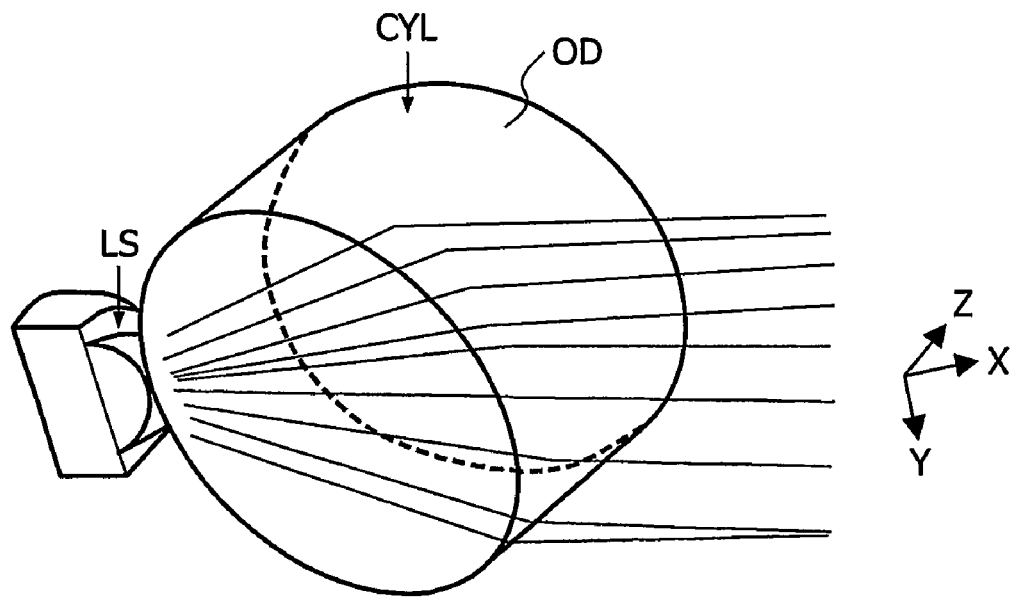
FIG. 2 represents a perspective view of a lighting device of the invention cut along plane AA as represented in FIG. 1 and illustrates the functioning of such a lighting unit in the plane XY of FIG. 1.

FIG. 2 is a perspective view of a lighting device of the invention cut along plane AA as represented in FIG. 1. It illustrates the functioning of the lens in the plane XY. Light rays emitted from said light source LS are spread around a beam direction. Light rays are not all parallel to said beam direction at the output of said light source LS. This implies the use of guiding means. According to the invention, the guiding means direct the light rays around said beam direction in order that said light rays are quite parallel in the plane XY to said beam direction when output from said lens. The lens as proposed according to the invention thus enables a guiding of light rays inside a narrow angle in the plan XY. Consequently a strip of light is obtained in any plane quite parallel to plane XY.

The circular shape of the cylindrical portion CYL of the lens in the plane (X,Y) and the presence of the convex shaped surface enable to direct the light rays in such a way.

Figure 3:
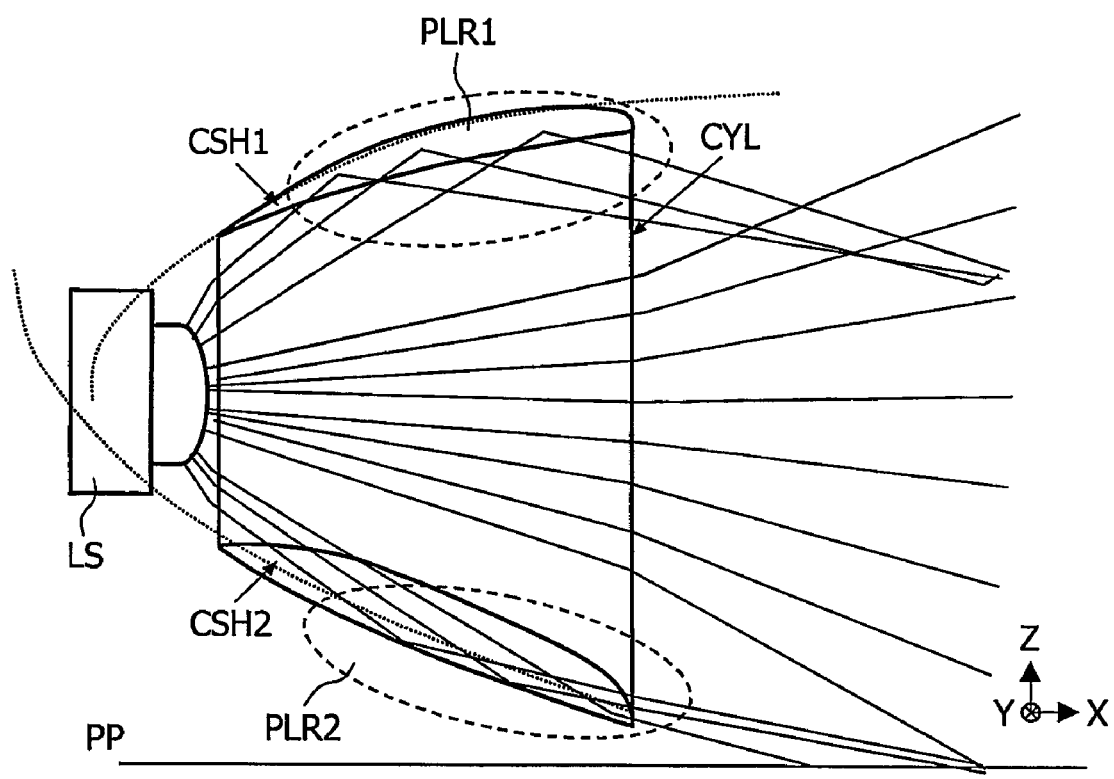
FIG. 3 is a section of a lighting device of the invention along the plane XZ of FIG. 1; it illustrates the functioning of the lighting device in said plane XZ.

FIG. 3 is a section of a lighting device of the invention along the plane XZ and centered on the light source; it illustrates the functioning of the lighting device in the plane XZ. Said lens presents at least one convex shaped surface CSH1 extending at an extremity of said cylindrical portion and reflecting and refracting a part PLR1 of light rays emitted from said light source towards said projection plane PP. According to the exemplary embodiment presented on this figure, an other convex shaped surface CSH2 is extending at the other extremity of said cylindrical portion CYL. It also reflect an other part PLR2 of light rays towards said projection plan PP. The shape of these surfaces CSH1 and CSH2 are chosen for such a purpose. These surfaces can present a parabolic shape as illustrated in broken line in FIG. 3: said convex shaped surfaces follow the shape of a portion of a parabole.

Figure 4:
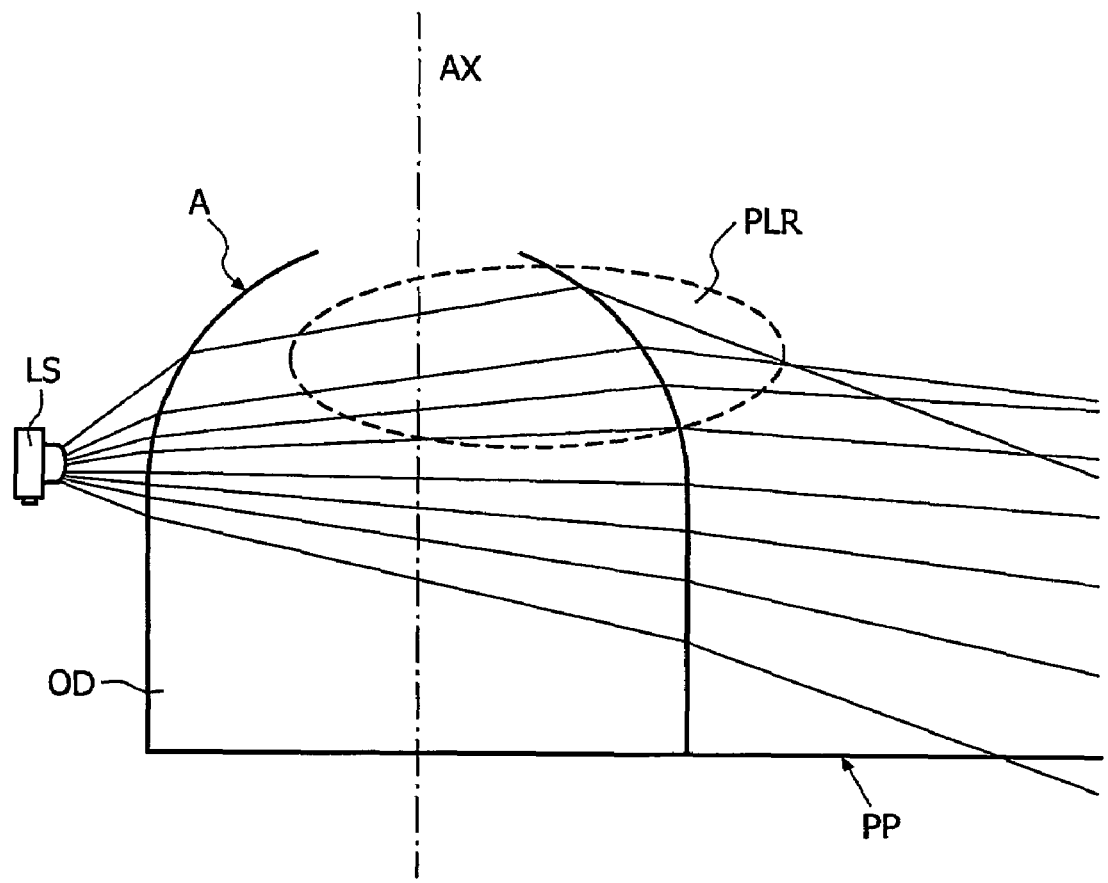
FIG. 4 represents a section of another exemplary embodiment of a lighting device of the invention and synthetically illustrates the functioning of such an embodiment in the plane XZ of FIG. 1.
Figure 5:
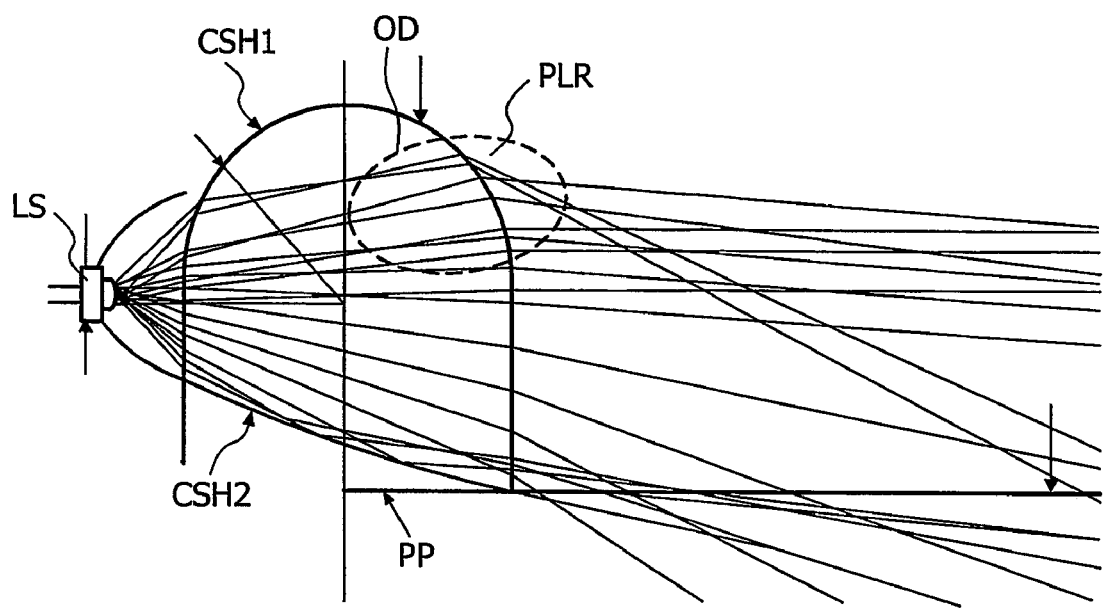
FIG. 5 more specifically illustrates the functioning of a lighting device according to the exemplary embodiment presented in FIG. 4.

FIG. 4 represents a section of another exemplary embodiment of a lighting device of the invention and synthetically illustrates the functioning of such an embodiment. In this embodiment a section A rotates around the axis AX in order to generate the convex shaped surface. In the example presented in FIG. 4, said section A is a portion of a circle thus generating a portion of a sphere as the convex shaped surface CSH1 as represented in FIG. 5. This shape enables to direct a part of the light rays PLR towards said projection plane PP.

Advantage of the presented embodiment is the easy feasibility of the lens as rotational parts are easy to manufacture. Moreover rotational and hemispherical surfaces are easy to polish with a good accuracy.

FIG. 5 more specifically illustrates the functioning of a lighting device according to the exemplary embodiment as presented in FIG. 4. In this figure the top part of the lens OD represented by the convex shaped surface CSH1 is hemispherical. The bottom part, represented by the convex shaped surface CSH2, near the projection plane PP is a paraboloidal shaped surface whose focus point correspond to the light source LS position. The role of this paraboloidal shape which focus corresponds to the light source LS point cut the cylindrical portion CYL in such a way that the shape enable the redirection of the light rays on the projection plane PP.

With the presented embodiments, the length of the beam and the light level on the projection plane PP is obtained by adjusting the position of the light source LS on direction Z. This is consequently possible to use a same lens OD for different applications and to adapt the device to several applications.

Figure 6:
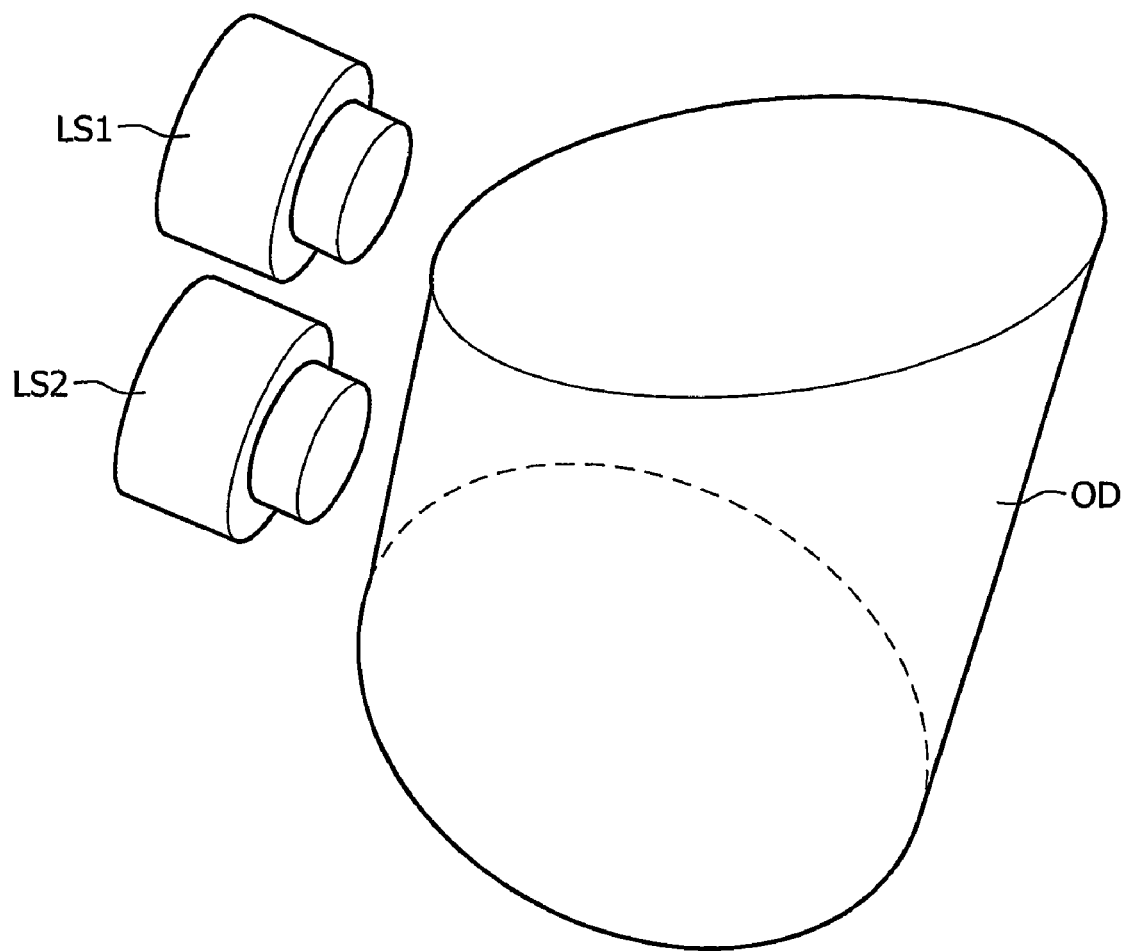
FIG. 6 illustrates an alternative of the invention.

FIG. 6 presents an alternative of the invention. Such alternative of the invention uses several light sources LS1, LS2 using the same lens OD. According to the position of the light sources LS1 and LS2 according to the lens OD it is possible to have a multi coloured light projected on said projection plane PP. Such an alternative can be used in any applications where multicolored beams are desirable.

Some examples of applications are presented in the following.

Figure 7A:
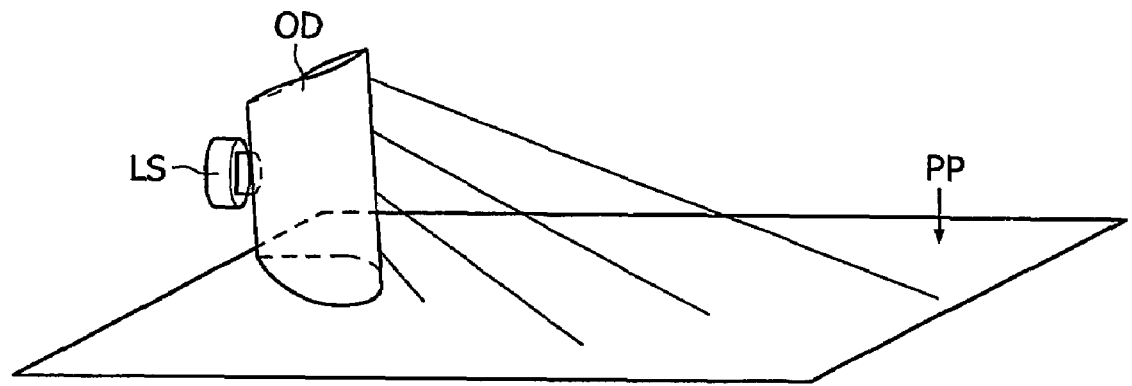
FIG. 7 illustrates a first application of the invention.
Figure 7B:
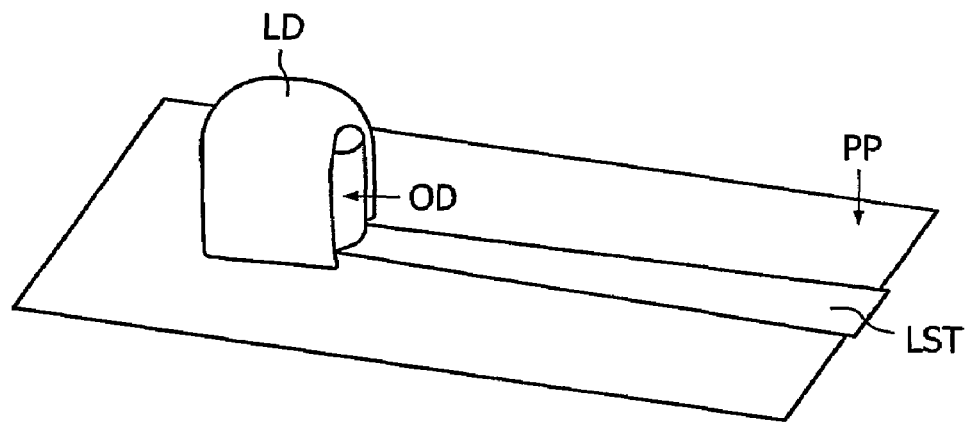
Figure 7C:
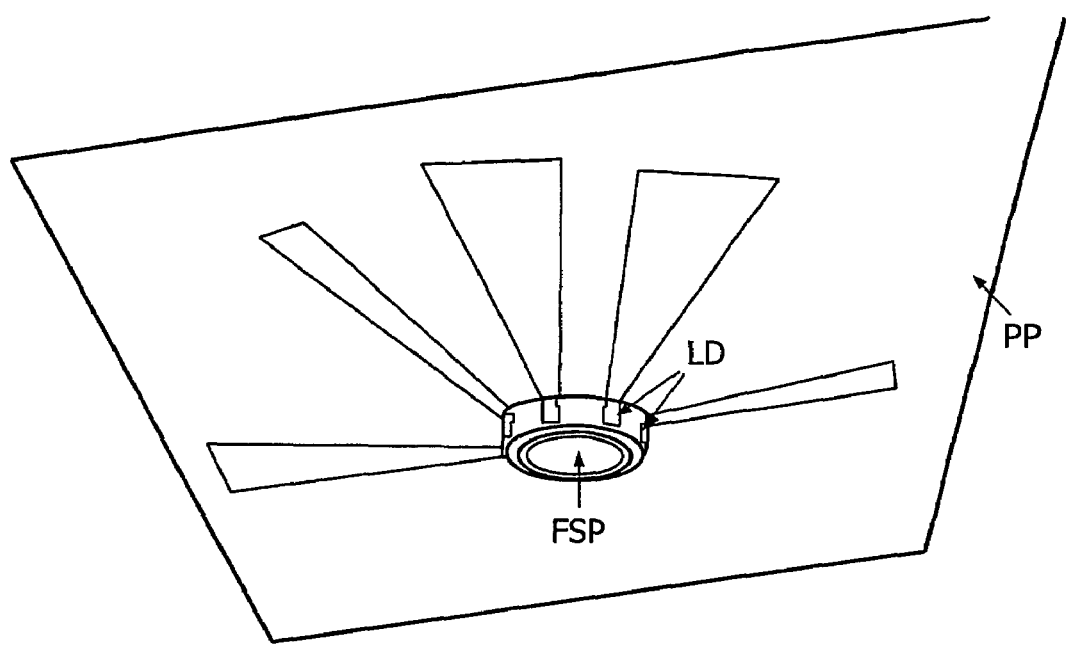
Figure 7D:
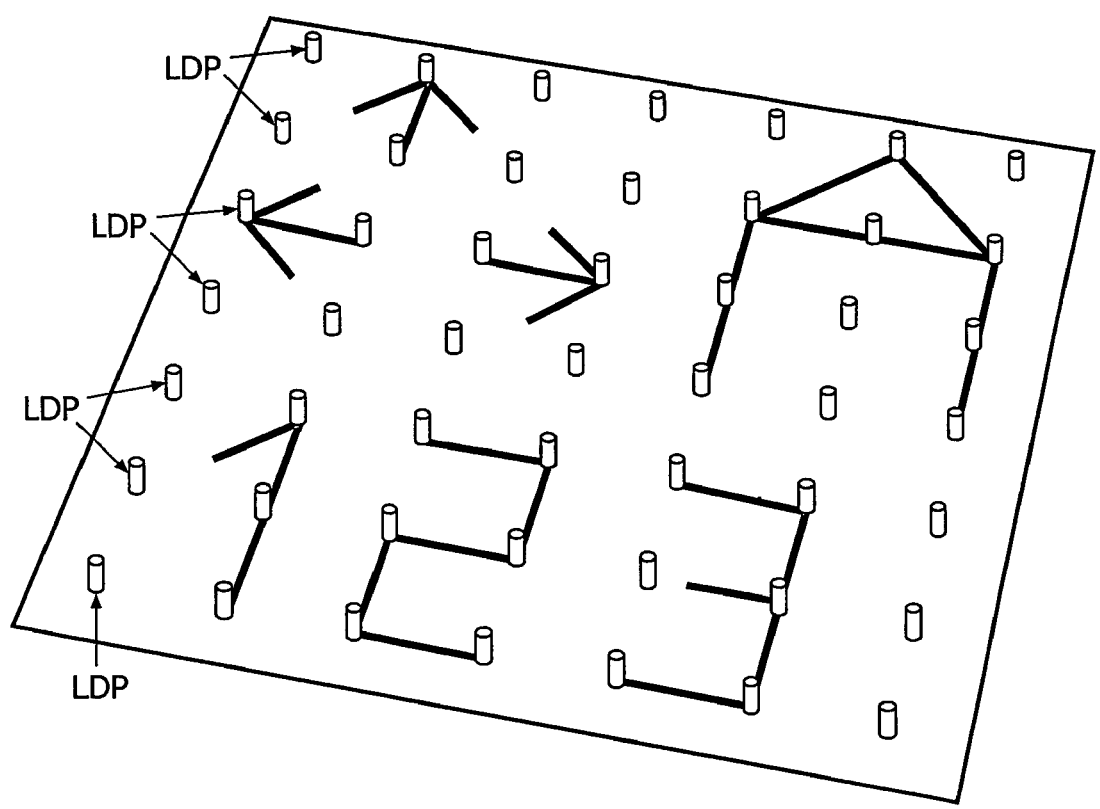

According to a first application presented in FIG. 7a, the light is simply projected on a projection plane PP generating a strip of light LST on the surface of said projection plane PP as illustrated in FIG. 7b. Such a first application can be used for illumination or for display. For example, it may be used for the illumination of a ceiling as shown in FIG. 7c. The obtained luminaire is very flat and very compact. The distribution of several lighting devices LD as described hereinabove around the circumference of such a luminaire enables to free a space FSP in the center of said luminaire. This space FSP can, for example, be used to place a fire extinguisher or another light source LS or any other supplementary feature. Such a luminaire can also be used in museum to illuminate objects in specific locations. This application may also be used for display device as shown in FIG. 7d. Such a display device uses lighting devices according to the invention. Each lighting device generates a part of arrows or of the different represented signs. Advantageously several lighting devices are concentrated in each point LDP. For example, when 8 lighting device as described above are implemented in each point LDP, the beam(s) projected from a point LDP can have 8 different directions.

Figure 8A:
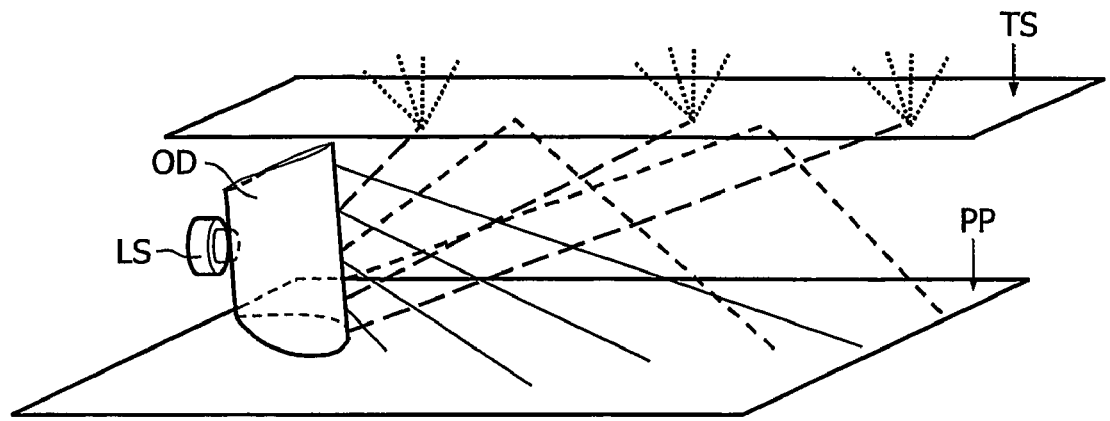
FIG. 8 illustrates a second application of the invention.
Figure 8B:
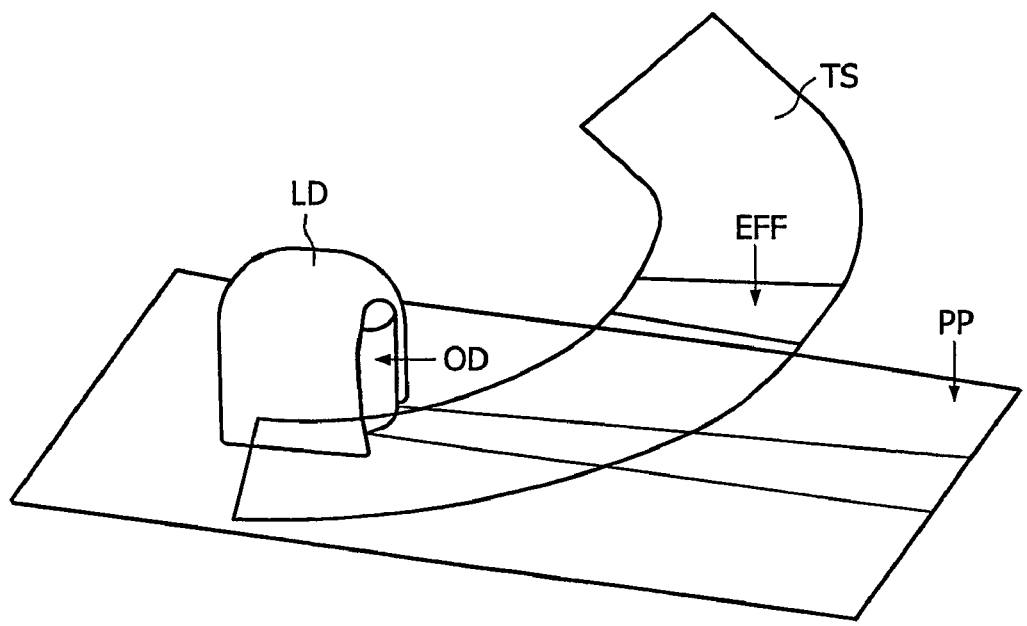

According to a second application of the invention presented in FIG. 8, a sheet TS of transparent material is provided parallel to the projection plane PP and on the top of the lens OD. Such a transparent material may be glass, plexiglas or any transparent or even translucide material. As illustrated in FIG. 8a, light rays that are not redirected towards said projection plane PP by the lens OD are transmitted by refraction and visible in different directions by diffusion through said sheet TS of transparent material. This application can be useful when 3 dimensional effects are requested as shown in FIG. 8b. In this Figure, the sheet of transparent material covers partially the lighting device, but a total coverage is also possible as explained hereinafter. Effectively, 3 dimensional effects may be provided by adding a sheet of transparent material covering the totality of the display device as shown in FIG. 7d. In this case arrows and different signs appear as a double line in space. This corresponds to a combination of the second and the third applications.

Figure 9A:
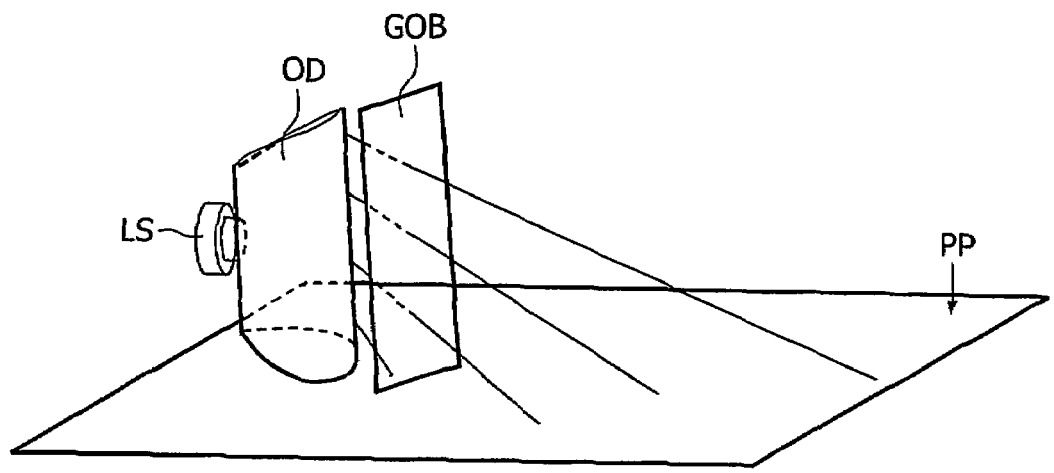
FIG. 9 illustrates a third application of the invention.
Figure 9B:
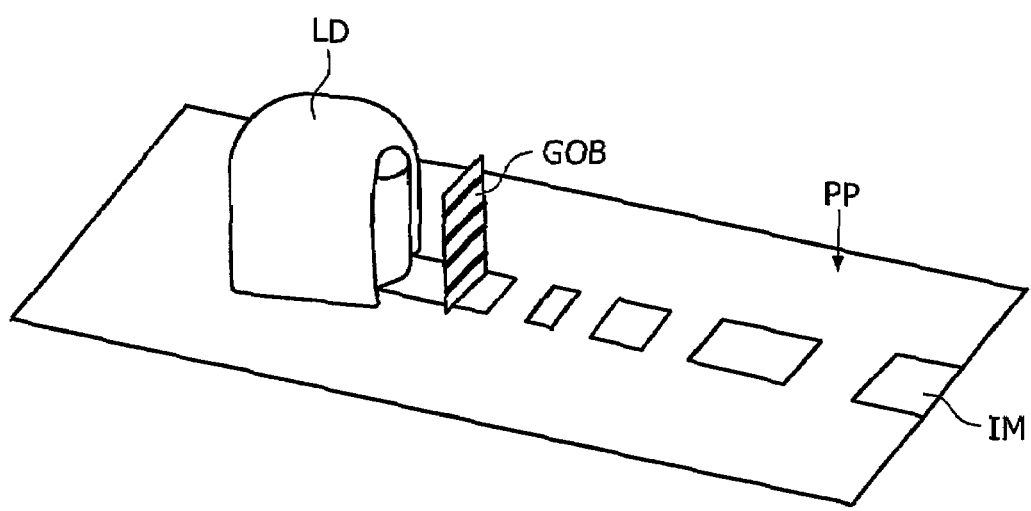
Figure 9C:
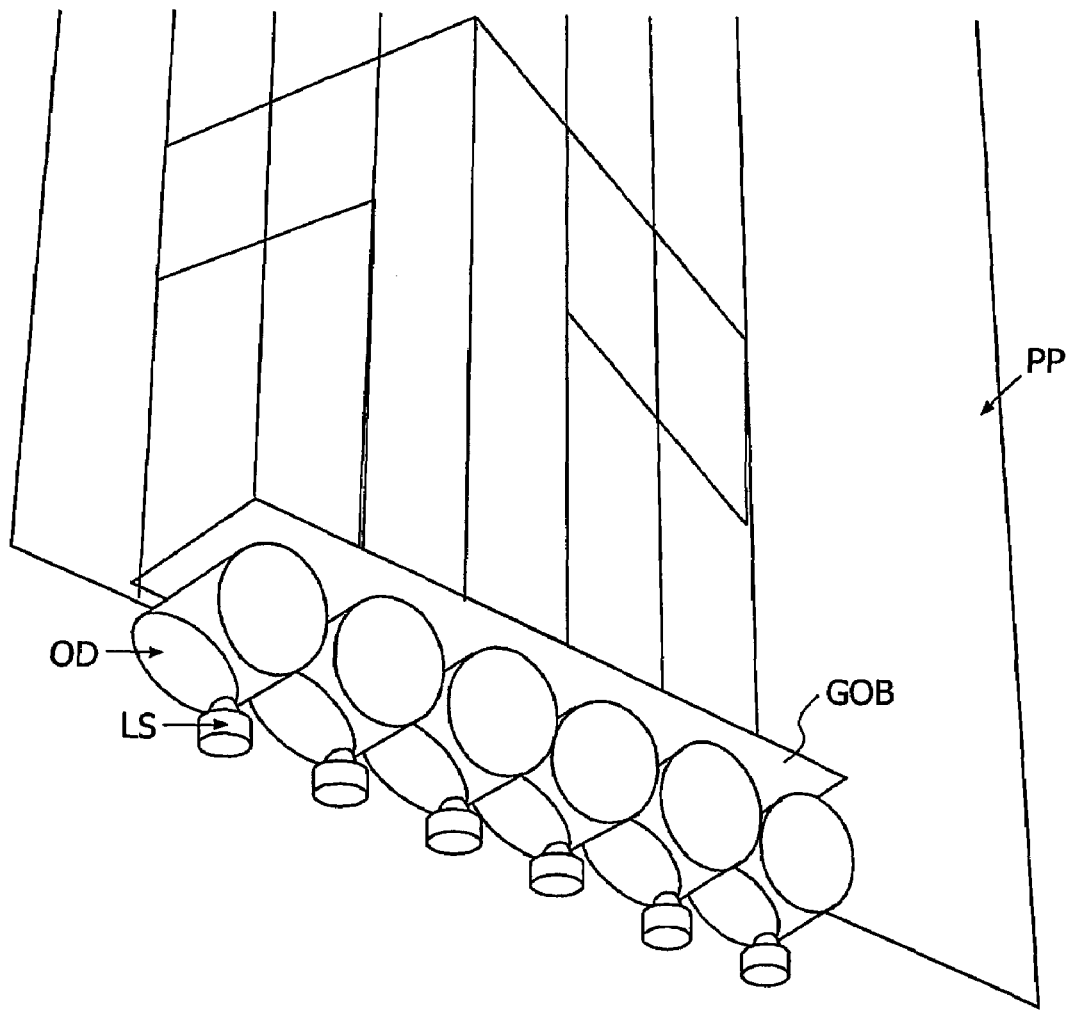

According to a third application presented in FIG. 9, an image IM is projected on the projection plane PP as presented in FIG. 9b. Specifically calculated gobbos GOB are used. As shown in FIGS. 3 and 5, light rays cross each other. Consequently, such gobbos GOB are generated line by line and by backpropagation of the light. The projected image IM is thus not simply and directly reproduced on a gobbo GOB but the image IM is decomposed on the gobbo GOB in order to be recomposed by the light rays on the projected plane PP. An example of this application in signaletics is given in FIG. 9c where an arrow is drawn on the projection plane PP. In this example several lighting device of the invention are used to draw the arrow but a smaller one could be obtain by using a single lighting device of the invention with a specifically calculated gobbo. Other patterns may effectively be projected according to the invention. Adapted gobbos can be calculated by backpropagation for any desired drawing in projection.

It is to be understood that the present invention is not limited to the aforementioned embodiments and variations and modifications may be made without departing from the spirit and scope of the invention as defined in the appended claims. In the respect, the following closing remarks are made.

It is to be understood that the present invention is not limited to the aforementioned applications. It can be used within any application needing guided light rays.

It is to be understood that the method according to the present invention is not limited to the aforementioned embodiments, alternatives and applications. For example, it could be advantageous to add a diaphragmma near the light source or near said lens in order to reduce light ray parasiting the beam.

Any reference sign in the following claims should not be construed as limiting the claim. It will be obvious that the use of the verb "to comprise" and its conjugations do not exclude the presence of any other steps or elements besides those defined in any claim. The article "a" or "an" preceding an element or step does not exclude the presence of a plurality of such elements or steps.

The invention claimed is:

1. A lighting device comprising:
   at least a light source for emitting light rays and being oriented along a source axis; and
   a lens for guiding said light rays on a projection plane; the lens presenting a cylindrical portion extending along a longitudinal lens axis perpendicular to said projection plane and to said source axis, and at least a convex shaped end surface extending at an extremity of said cylindrical portion and adapted to direct a portion of the light rays emitted from said light source towards said projection plane.

2. The lighting device as claimed in claim 1, wherein said cylindrical portion has a base chosen among a circular base, a curve base, a meniscus base, a fresnel base.

3. The lighting device as claimed in claim 1, wherein said lens is shaped such as two convex surfaces are extending at both extremities of said cylindrical portion.

4. The lighting device as claimed in claim 1, wherein said convex surface is a hemispherical surface symmetrical in rotation around said lens axis.

5. The lighting device as claimed in claim 1, wherein said convex surface is parabolic.

6. The lighting device as claimed in claim 1, said lighting device comprising several light emitting diodes for a same lens.

7. The lighting device as claimed in claim 1, wherein said projection plane is a sheet of a transparent material adapted to transmit the light by refraction and diffusion.

8. The lighting device as claimed in claim 1, wherein said lighting device further includes an optical element placed beyond the lens with respect to the light source, said optical element presenting features drawn line by line in order that said lighting device project an image on said projection plane.

9. The lighting device of claim 1, wherein the convex shaped surface is configured to reflect the light rays towards the projection plane.

10. The lighting device of claim 1, wherein the convex shaped surface is configured to direct the light rays along strips in a plane perpendicular to the lens axis.

11. The lighting device of claim 1, wherein a position of the light source along a direction of the lens axis corresponds to a length of a light beam projected on the projection plane so that adjusting the position changes the length.

12. The lighting device of claim 1, wherein a position of the light source along a direction of the lens axis corresponds to a length and a light level of a light beam projected on the projection plane so that adjusting the position changes the length and the light level.

13. The lighting device of claim 1, wherein the lens further comprises a further convex shaped surface extending at a further extremity of the cylindrical portion, the convex shaped surface and the further convex shaped surface being configured to reflect said light rays towards said projection plane.

14. The lighting device of claim 13, wherein the convex shaped surface is a hemispherical shaped surface and the further convex shaped surface is a paraboloidal shaped surface.

15. The lighting device of claim 14, wherein the hemispherical shaped surface is located further away from the projection plane than the paraboloidal shaped surface.

16. The lighting device of claim 14, wherein a focus point of the paraboloidal shaped surface corresponds to a position of the light source.

* * * * *